United States Patent [19]
Hino et al.

[11] 4,020,912
[45] May 3, 1977

[54] INDICATION APPARATUS WITH DISCRETE ILLUMINATED PROJECTIONS

[75] Inventors: Masamichi Hino, Suita; Kou Fukui; Tsuneo Kashitani, both of Osaka; Kazuyoshi Enomoto, Kawachinagano; Setsuo Hijikata, Yao, all of Japan

[73] Assignee: Kubota Ltd., Osaka, Japan

[22] Filed: May 10, 1976

[21] Appl. No.: 684,921

[30] Foreign Application Priority Data

Feb. 14, 1976  Japan ............................ 51-15576
Feb. 14, 1976  Japan ............................ 51-15577
Feb. 14, 1976  Japan ............................ 51-15578
Feb. 14, 1976  Japan ............................ 51-16921

[52] U.S. Cl. ......................... 177/178; 177/210 R; 177/DIG. 6; 250/231 SE; 116/129 P
[51] Int. Cl.² .................. G01G 23/32; G01G 3/14; G01D 5/34; G09F 9/00
[58] Field of Search .......... 177/178, 210 R, DIG. 6; 250/231 SE; 116/129 P, 129 L

[56] References Cited

UNITED STATES PATENTS

| | | | |
|---|---|---|---|
| 2,065,960 | 12/1936 | Bauml | 177/DIG. 6 |
| 2,807,189 | 9/1957 | Wagner | 177/178 X |
| 3,461,986 | 8/1969 | Schierbeck | 177/178 |
| 3,912,028 | 10/1975 | Schwarz | 177/178 X |
| 3,916,185 | 10/1975 | Jehly | 250/231 SE |
| 3,967,271 | 6/1976 | Day | 177/DIG. 6 |
| 3,973,109 | 8/1976 | Foster | 177/DIG. 6 |

*Primary Examiner*—George H. Miller, Jr.
*Attorney, Agent, or Firm*—W. G. Fasse; W. W. Roberts

[57] ABSTRACT

An indicating apparatus for indicating measured values in a digital manner, comprising a graduated plate adapted to be moved in accordance with the weight of an object to be weighed, the graduated plate being provided with numerical characters for indicating the weight in a digital manner and displacement indicating marks for detection of the displacement of the graduated plate, the numerical characters and displacement indicating marks being arranged in the direction of movement of the graduated plate, two light sources opposed to the graduated plate and individually correlated with two adjacent numerical characters, the two light sources being controlled so that either one of them is turned on in response to a signal indicating the displacement of the graduated plate represented by the associated displacement indicating mark thereby to indicate the measured value in a digital manner.

18 Claims, 11 Drawing Figures

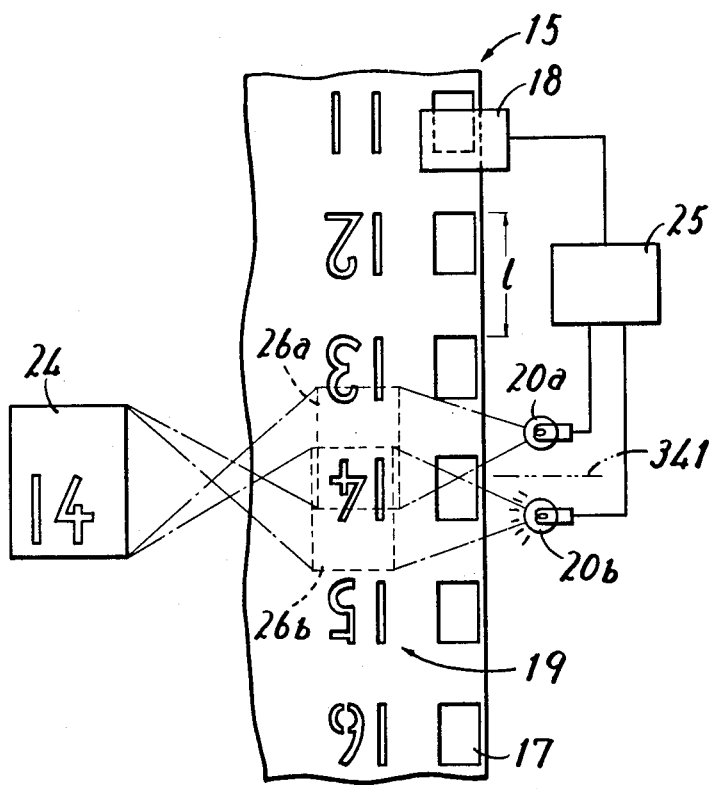
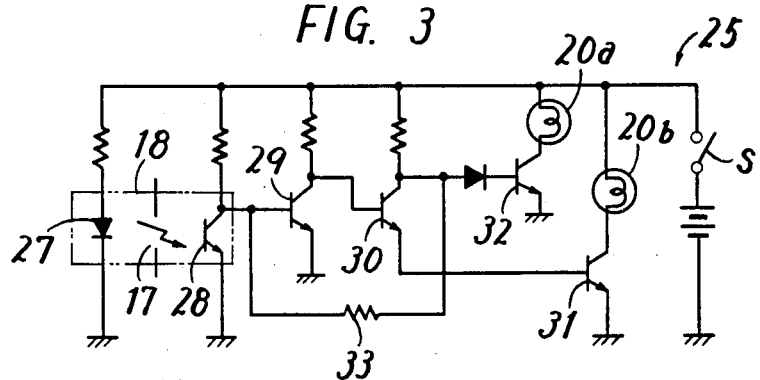
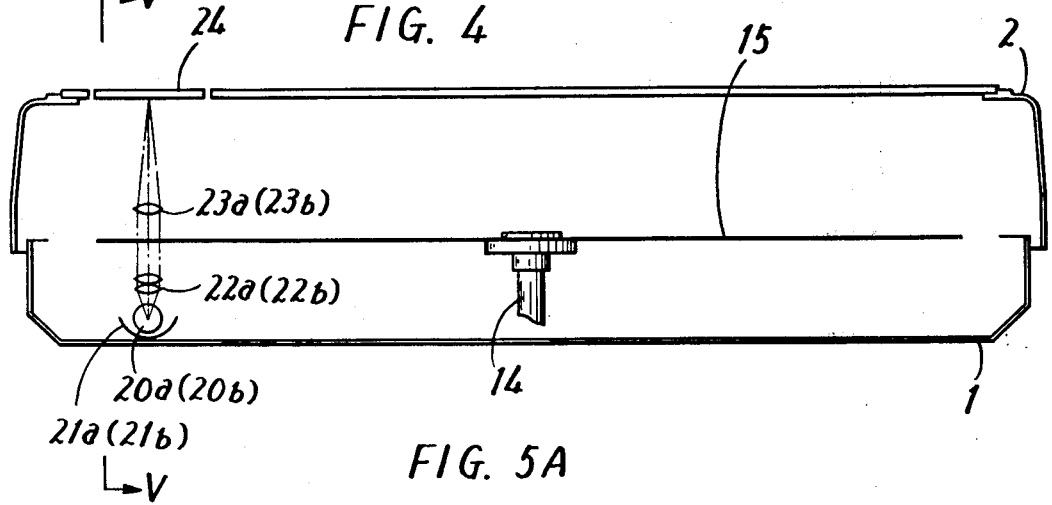
FIG. 3
FIG. 4
FIG. 5A
FIG. 5B

INDICATION APPARATUS WITH DISCRETE ILLUMINATED PROJECTIONS

BACKGROUND OF THE INVENTION

1. Field of the Invention;

The present invention relates to an indicating apparatus and more particularly it relates to an indicating apparatus of the type in which measured values correlated with some physical quantity are stepwise indicated by optical means.

2. Description of the Prior Art

What forms the background of the present invention is, for example, an apparatus for indicating measured values provided by a weighing machine. Conventionally, for the purpose of indicating measured values, suitable converter means is used to convert a measured value into a visual physical quantity, so that the measured value is indicated in terms of such physical quantity. In the case of a weighing machine, such visual quantity is, for example, the amount of movement of a pointer or the amount of movement of a graduated plate. Therefore, the measured value is recognized by reading the graduation pointed by a pointer. In case where measured values are indicated in an analog manner by cooperation between the graduated plate and the pointer, as described above, it is rarely that a graduation and the pointer come into alignment with each other, thus making it necessary to judge to which graduation the pointer lies nearest, i.e. to make an arithmetical processing of the figures in specified less significant digits, such as rounding, i.e. the operation of dropping decimal figures to the right of a specified number of digits after increasing the final remaining figure by 1 if the first digit dropped is 5 or greater, which is a troublesome operation.

If a continuous physical quantity as described above is represented in a digital manner, it is possible for an operator to read out the measured value at a glance. For this reason, there have been proposed various indicating apparatuses for electronically processing physical quantities correlated with measured values and representing them in a digital manner. Such digital indicating apparatus, however, has to use a large number of expensive electronic circuits and hence apparatuses, such as weighing machines, incorporating it therein are expensive.

Examples of the prior art which has solved the above problem by optical means and which is of particular interest to the present invention will now be described.

As a technique of particular interest to the present invention, mention may be made of Japanese Patent Publication No. 15033/69 entitled "Indicating Apparatus for Indicating Weight and the Like", published on July 4, 1969. It does not provide a purely digital representation, however, and it is an improvement of an optical projecting apparatus including lenses for magnifying graduations and an array of numerals corresponding thereto movable in accordance with measured values and projecting the relevant graduation the numerals corresponding thereto, comprising a light shielding plate disposed in the optical path of the optical projecting apparatus for shielding the light in a predetermined range, so that the image is projected on a suitable screen. Thus, the graduated plate is provided with numerals laterally of the graduations such that the numerals correspond to the latter and the graduation and numerals will be projected on the screen. Since the graduations except the one corresponding to the numerical value which has been rounded (in the sense described above) are shielded, only one graduation is projected on the screen. Therefore, by reading the numeral corresponding to this graduation, the rounded measured value is obtained. The control of the movement of the shield plate is achieved, for example, by a solenoid in connection with an arithmetically rounding mechanism.

Another technique of interest to the present invention is U.S. Pat. No. 3,461,986, which discloses an apparatus for providing a digital indication of postal rates variable stepwise in accordance with the weight of postal matter, said apparatus being affixed to a postal weighing machine. The apparatus for providing a digital indication of postal rates is related to the present invention, and it works on the principle of the two-way switching of a reflecting mirror associated with a series of postal rate-indicating numerals movable depending upon the weight of postal matter, so as to optically provide a digital indication of the postal rate in a read-out window.

In the prior techniques described above, however, the means for selecting the graduation or numeral to be indicated, i.e., the means for selecting the numeral corresponding to the rounded measured value is realized by the movement of the shield plate or the two-way switching of the reflecting mirror driven by a solenoid or the like. This implies the presence of movable parts, which in turn complicate the mechanical construction, causing problems including breakdown and wear. Further, the prior art apparatuses are disadvantageous in that power is needed to drive the solenoid and particularly when an electric battery is used to drive the same, the battery is consumed very much.

SUMMARY OF THE INVENTION

The present invention eliminates the various problems in the prior art and provides an indicating apparatus capable of stepwise indicating numerical values correlated with a physical quantity by simply turning on a selected light source.

An indicating apparatus according to the invention comprises a scale plate movable in a predetermined direction, means for producing a physical quantity, and means for displacing said scale plate by an amount correlated with a physical quantity provided by said physical quantity producing means in response to said physical quantity. Characters representing numerical values successively correlated with the physical quantity are arranged on the scale plate in the direction of movement thereof. Also arranged on the scale plate in the direction of movement thereof is displacement detecting mark means correlated with said successive arrangement of numerical value representing characters. There are provided a plurality of light sources opposed to said scale plate and individually correlated with a predetermined plurality of adjacent ones among said plurality of numerical value representing characters, and also a power source is provided for activating said light sources. The said plurality of light sources are controlled so that only one of them is selectively energized whereby one of said plurality of adjacent numerical value representing characters correlated with said physical quantity is rendered selectively visible. That is, the indicating apparatus includes means for generating a signal representing the displacement of said scale plate in response to the displacement detecting mark means, and energization control means for selectively energizing only one of said plurality of light sources in response to said generated signal so as to selectively indicate the relevant one of said plurality of adjacent numerical value representing characters correlated with said physical quantity. The present indicating apparatus, therefore, stepwise indicates numerical values correlated with said physical quantity by said numerical value representing characters.

In the present inventive indicating apparatus, the means for selecting one of the plurality of adjacent numerical value representing characters, which operation corresponds to the arithmetical processing of the figures in specified less significant digits, is realized by the switching of the plurality of light sources. Therefore, the absence of movable parts such as those driven by a solenoid as in the prior art is an important point.

Accordingly, a principal object of the present invention is to provide an indicating apparatus which is simple in construction and realized at low costs, wherein numerical values correlated with a physical quantity are stepwise indicated without the provision of any movable parts.

Another object of the invention is to provide an indicating apparatus which enables numerical value representing characters to be indicated in a larger size.

A further object of the invention is to provide an indicating apparatus which allows an analog indication to be incorporated therein with a minor modification in order to compensate for drawbacks of the stepwise indication.

Still a further object of the invention is to provide an indicating apparatus arranged so that numerical value representing characters which are selectively indicated by a plurality of light sources can be indicated at a common position.

Other objects and features of the present invention will be more apparent from the detailed description taken in conjunction with the accompanying drawings.

BRIEF DESCRIPTION OF THE DRAWINGS

FIG. 3 is a diagrammatic illustration of the principal portions of the indicating apparatus shown in FIG. 2;

FIG. 4 shows by way of example a lamp switching circuit;

FIG. 5A is a schematic sectional view of the principal portions of a preferred embodiment of the invention wherein the indicating apparatus shown in FIG. 2 is applied to the weighing machine for body weight measurement shown in FIG. 1;

FIG. 5B is a side view of the FIG. 5A embodiment seen in the V direction;

DESCRIPTION OF THE PREFERRED EMBODIMENTS

Figure 1:
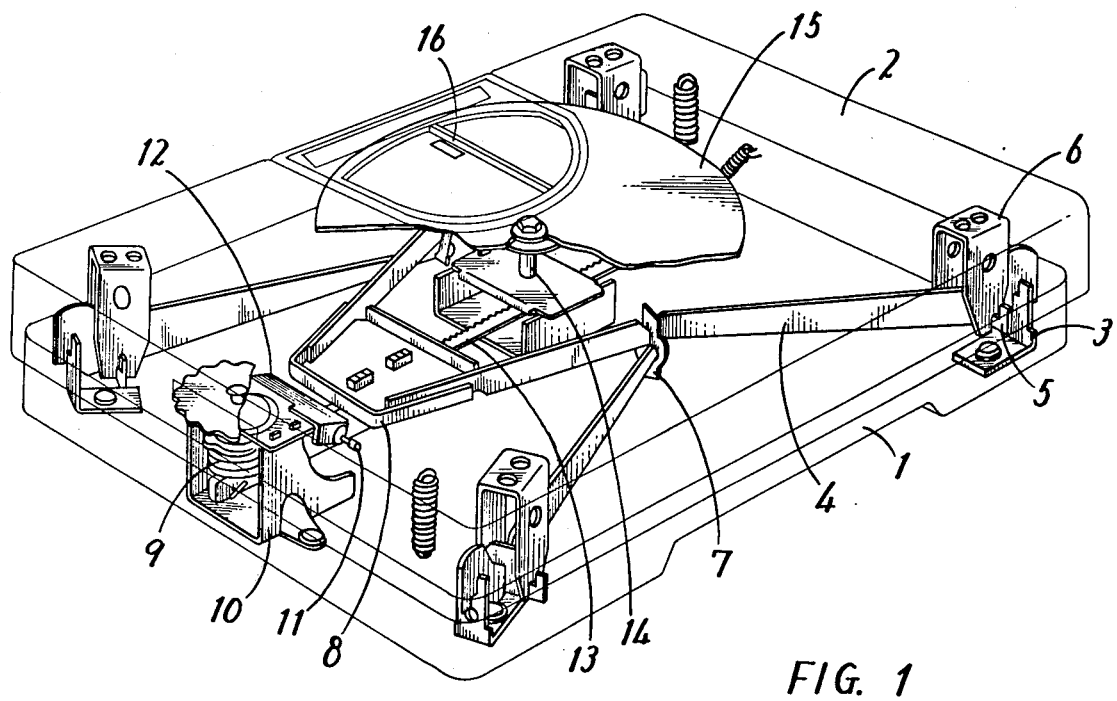
FIG. 1 is a perspective view of the construction of a weighing machine for body weight measurement for explanation of a background in which the present invention can be advantageously employed.

FIG. 1 is a perspective view of the construction of a weighing machine for body weight measurement, explaining a background in which the present invention can be advantageously employed. The weighing machine includes a base plate 1 on which a weighing base 2 is positioned, said weighing base being supported by four edge members 6 carried on levers 5 through intermediate edges 5, one of the respective ends of said levers being pivotally supported on four fulcrum edges 3 disposed on the base plate 1. The action of the levers 4 is concentrated on a lever bracket 8 by hangers 7 and applied to a main spring 9. The resilient deformation of the main spring 9 is transmitted to a link lever 12 pivotally supported by a frame 10 through link pins 11, said link lever 12 translating a toothed rack 13. The translational movement of the rack 13 rotates a graduated plate shaft 14 concentrically fixed to a pinion (not shown) meshing with said rack 13, so that a graduated plate 15 is rotated through a predetermined angle.

The indicating apparatus of the present invention is applied to the weighing machine for body weight measurement shown in FIG. 1 and the like and will be hereinafter described in connection with such weighing machine.

Figure 2:
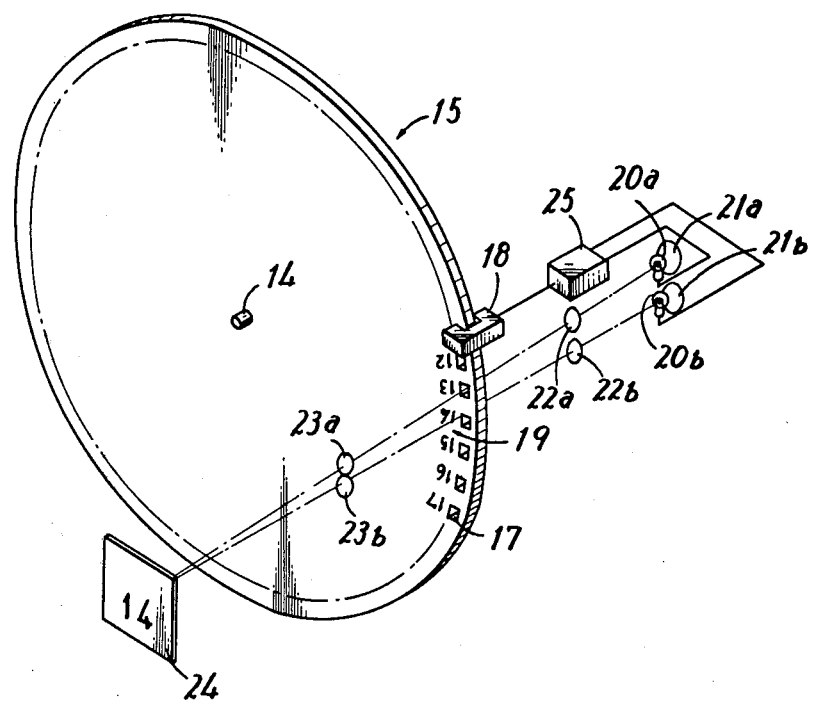
FIG. 2 is a schematic view of an embodiment of an indicating apparatus according to the invention.

FIGS. 2 and 3 illustrate the graduated plate 15 of the weighing machine whose construction has been described with reference to FIG. 1. Referring to FIGS. 2 and 3, the graduated plate 15 is adapted to be rotated around the axis of the shaft 14 through a predetermined angle in connection with a measured value provided by the weighing machine, as described above. The graduated plate 15 is made of a suitable optically impervious material. The graduated plate 15 is provided, by perforation, with position detecting marks 17 for arithmetical rounding purposes (in the sense described above) in the form of optically transmitting rectangular areas equispaced around the outermost periphery thereof. Associated with said detection marks 17 is provided a photointerrupt 18 comprising a light source, such as a light emitting diode, an incandescent lamp or the like and a photosensitive device such as a phototransistor, a solar cell or the like. Provided in relation to the pitch $l$ of the position detecting marks 17 is a series of graduation numerals 19 formed in the form of optically transmitting areas by being cut out along and radically inside the series of detection marks 17. As best seen in FIG. 3, one graduation numeral out of the numeral series 19 exists in each pitch $l$ of the position detecting marks 17, the longitudinal dimension of each graduated numeral 19 being half the pitch $l$ and preferably slightly smaller than a half of the pitch $l$.

The optical system of this indicating apparatus will now be described. The optical system includes two lamps 20a and 20b serving as light sources, condenser mirrors 21a and 21b disposed rearwardly of said lamps, and condenser lenses 22a and 22b disposed forwardly of said lamps. The light beams passing through the condenser lenses 22a and 22b are focused on the numeral series 19, the image of which is projected on a screen 24. The screen 24 is formed of a semitransparent material such as frosted glass.

The lamps 20a and 20b are controlled so that either one of them is turned on. This is related to the rounding function in the arithmetical sense described above which is carried out by a lamp switching circuit 25 controlled by the output from said photointerrupter 18. An embodiment of the switching circuit 25 will be later described.

In addition, in order to prevent the projection of unwanted graduated numerals due to the divergence of light from the lamps 20a and 20b, it is preferred to provide a shutter 341 (diagrammatically illustrated in FIG. 3) so as to establish independence between the optical system associated with the lamp 20a and the optical system associated with the lamp 20b.

The operation of the indicating apparatus will now be described mainly with reference to FIG. 3. In FIG. 3, the marginal portion of the circular graduated plate 15 and the circular arrays of position detecting marks 17 and numerals 19 are illustrated in a linear representation for facility of illustration, and it is to be pointed out that the graduated plate 15 will be translated in a vertical direction. Two rectangles 26a and 26b shown in chain lines in relation to the numeral series 19 each indicate a range of an image to be projected on the screen 24. In the condition shown in FIG. 3, a position detecting mark 17 of optically transmitting nature is overlapped by a certain area of the photointerrupter 18, when the output from the photointerrupter causes the lamp switching circuit 25 to turn on the lamp 20b and the portion defined by the rectangle 26b is projected on the screen 24 to provide a numerical indication of the numeral 14. It is when the measured value is 13.5 or above and less than 14.5 that the numeral 14 is indicated.

If the graduated plate 15 is upwardly moved from the condition shown in FIG. 3, the area of the position detecting mark 17 of optically transmitting nature overlapped by the photointerrupter 18 is reduced and the output from the latter is also reduced. The lamp switching circuit 18 has a threshold value preset therein so that when the output from the photointerrupter 18 is reduced below said threshold value, the lighting is shifted from the lamp 20b to the lamp 20b. At this time, the numeral 14 enters the rectangle 26a, so that numeral 14 is still indicated on the screen 24. As the graduated plate 15 is further upwardly moved, the area of the optically transmitting detection mark 17 overlapped by the photointerrupter 18 is further reduced until it is nil, whereupon the next position detecting mark 17 begins to be overlapped. If the overlap portion increases in size until the output from the photointerrupter exceeds said threshold value, the lighting is shifted to the lamp 20b. That is, when the measured value is 14.5 or above, the lamp 20b is lighted. At this time, only the numeral 15 is present in the range defined by the rectangle 26b and the numeral 15 is indicated on the screen 24. Thereafter, the lighting is shifted between the lamps 20a and 20b in the same manner.

If the graduated plate 15 is downwardly moved from the condition shown in FIG. 3, the size of the portion of the optically transmitting detection mark 17 overlapped by the photointerrupter 18 is once increased and then reduced and hence the output from the photointerrupter is once increased and then reduced. When the decreasing output falls below said threshold value, the lighting is shifted from the lamp 20b to the lamp 20a. That is, when the measured value is less than 13.5, the lamp 20a is lighted and at this time only the numeral 13 is present in the range defined by the rectangle 26a and the numeral 13 is indicated on the screen 24. As the graduated plate 15 is further downwardly moved, the size of the portion of the optically transmitting detection mark 17 overlapped by the photointerrupter 18 is further reduced, and if the output from the photointerrupter falls below the threshold value, the lighting is shifted from the lamp 20a to the lamp 20b. At this time, the numeral 13 is present in the rectangle 26b and the numeral 13 is still indicated on the screen 24. Thereafter, the lighting is shifted between the lamps 20a and 20b in the same manner. In this way, the measured value is rounded to the nearest whole number and the lamp associated with the thus rounded measured value is lighted so that said whole number representing the rounded measured value is indicated on the screen.

FIG. 4 shows an embodied example of the lamp switching circuit 25. To describe the arrangement and operation of the circuit with reference to FIG. 4, when the switch S is closed, the light beams from the light emitting diode 27 constituting the photointerrupter 18 are received by the phototransistor 28 through the optically transmitting position detecting mark 17. The amount of light received depends on the relative positional relationship between the position detecting mark 17 and the photointerrupter 18, as described above, and when it exceeds the predetermined amount, the phototransistor 28 is rendered conductive and hence the transistor 29 is rendered non-conductive, the transistor 30 conductive and the transistor 31 conductive, so that the lamp 20b is lighted. Since the transistor 32 is in non-conductive state at this time, the lamp 20a is not lighted. When the amount of light received by the phototransistor 28 does not reach the predetermined value, the phototransistor 28 is rendered non-conductive and hence the transistor 29 is rendered conductive, the transistor 30 non-conductive and the transistor 32 conductive, so that the lamp 20a is lighted. Since the transistor 31 is in non-conductive state at this time, the lamp 20b is not lighted. This circuit is constituted by the so-called Schmitt circuit wherein positive feedback is applied through a resistor 33, assuring that the shifting between the lamps 20a and 20b takes place in an instant, never bringing about an ambiguous situation in which both lamps are lighted simultaneously. In addition, said predetermined value, i.e., threshold value, is obtained by suitably selecting the resistances of the plurality of resistors included in this circuit 25. The lamp switching circuit is, of course, not limited to it.

FIG. 5A illustrates a preferred embodiment of the present invention, which is a schematic sectional view of the principal portions, wherein the indicating apparatus of the invention is applied to the weighing machine for body weight measurement shown in FIG. 1. FIG. 5B illustrates a side view of the FIG. 5A embodiment seen in the V direction. In order to facilitate comparison between FIGS. 1 and 2, like parts are designated by like reference characters. As described above, the weighing base 2 is positioned on the base plate 1. The screen 24 is provided on the weighing base 2. The optical system of the indicating apparatus of the invention extends across opposite sides of the graduated plate 15. Thus, arranged below the graduated plate 15 are the lamps 20a, 20b, condenser mirrors 21a, 21b and condenser lenses 22a, 22b while arranged above the graduated plate 15 are the projecting lenses 23a, 23b and screen 24. In order to maintain the relative positional relationship of the optical system unchanged during body weight measurements, the shaft 14 of the graduated plate 15, the lamps 20a, 20b, the condenser mirrors 21a, 21b, the condenser lenses 22a, 22b, and the projecting lenses 23a, 23b should preferably be supported on the base plate 1.

In the embodiment described so far, the graduation numerals are arranged in a row and in order to prevent the simultaneous indication of adjacent numerals, only one numeral exists in the pitch l of the graduation numerals. Thus, the longitudinal dimension of each numeral has to be half the pitch l and preferably slightly smaller than a half of the pitch l. In other words, between adjacent graduation numerals, it is necessary to provide a space whose longitudinal dimension is at least equal to the longitudinal dimension of the graduation numerals. Therefore, when a large number of graduation numerals have to be arranged in a line of limited length, the size of the graduation numerals is limited. The following embodiments are capable of solving this problem.

Figure 6:
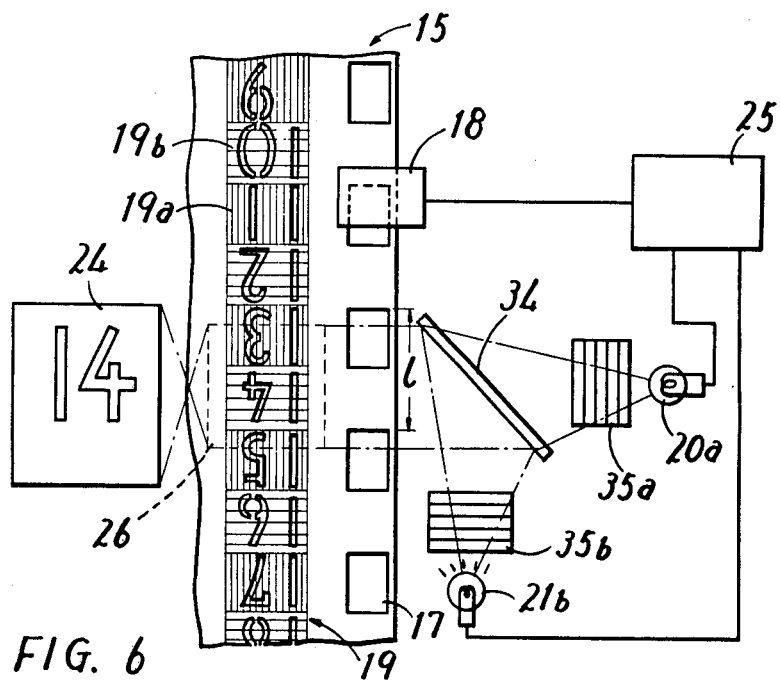
FIG. 6 illustrates another embodiment of the invention, showing the principal portions corresponding to FIG. 3.

FIG. 6 is a diagrammatic illustration of the principal portions of another embodiment of the invention, showing the portions corresponding to those shown in FIG. 3 described above. In FIG. 6, the parts which are the same as or similar to those in FIG. 3 are designated by the same reference numerals as those used in FIG. 3.

Referring to FIG. 6, a graduated plate 15 is made of a suitable optically impervious material. The graduated plate 15 is provided with position detecting marks 17 for arithmetical rounding purposes in the sense described above in the form of optically transmitting rectangular areas equispaced around the outermost periphery thereof, said detection marks 17 being associated with a photointerrupter 18 comprising a emitting diode and a phototransistor. Provided in relation to the pitch l of the position detecting marks 17 are graduation numerals 19 formed by being perforated along and radially inside the row of detection marks 17 at such a rate that two numerals exist for each detection mark 17. Longitudinal and horizontal polarization filters 19a and 19b, respectively, are alternately applied to the graduated numerals 19. In this embodiment, the graduation numerals 19 representing odd numbers have longitudinal polarization filters 19a while those representing even numbers have horizontal polarization filters 19b applied thereto.

The optical system of this indicating apparatus will now be described. The optical system includes two lamps 20a and 20b serving as light sources, condenser mirrors (not shown) disposed rearwardly of said lamps, and longitudinal and horizontal polarization filters 35a and 35b, respectively, disposed forwardly of said lamps. The light beams from the lamps 20a and 20b are each caused to have a single optical axis by a half mirror or plane parallel glass plate 34, the two resulting optical axes passing through a condenser lens (not shown) to reach the graduated plate 15. The light beams which have passed through the graduated plate 15 are projected on a screen 24 by a projecting lens (not shown).

The lamps 20a and 20b are controlled so that either one of them is lighted. This is related to the arithmetical rounding function which is carried out by a lamp switching circuit 25 controlled by the output from said photointerrupter 18. An embodied example of the switching circuit 25 is shown in FIG. 4.

The operation of the indicating apparatus will now be described with reference to FIG. 6. In FIG. 6, as in FIG. 3, the marginal portion of the circular graduated plate 15 and the circular arrays of position detecting marks 17 and numerals 19 are illustrated in a linear representation for facility of illustration, and it is to be pointed out that the graduated plate 15 will be translated in a vertical direction. A rectangle 26 shown in chain lines in relation to the series of numerals 19 on the graduated plate 15 indicates a range of an image to be projected on the screen 24. In the condition shown in FIG. 6, a position detecting mark 17 of optically transmitting nature is overlapped by a certain area of the photointerrupter 18, when the output from the photointerrupter 18 causes the lamp switching circuit 25 to light the lamp 20b. The light from the lamp 20b is horizontally polarized by the horizontal polarization filter 35b and then reaches the graduated plate 15. The horizontally polarized light can only pass through the horizontal polarization filters 19b associated with the graduation numerals 19, with the result that only the numeral 14 is indicated on the screen 24. It is when the measured value is 13.5 or above and less than 14.5 that the numeral 14 is indicated.

If the graduated plate 15 is downwardly moved from the condition shown in FIG. 6, the area of the position detecting mark 17 of optically transmitting nature overlapped by the photointerrupter 18 is reduced and the output from the latter is also reduced. The lamp switching circuit 25 has a threshold value preset therein so that when the output from the photointerrupter 18 is reduced below said threshold value, the lighting is shifted from the lamp 20b to the lamp 29a. That is, when the measured value is less than 13.5, the lamp 20a is lighted. At this time, the numeral 13 enters the range defined by the rectangle 26 and the light from the lamp 20a, which is longitudinally polarized, passes through the numeral 13 associated with the longitudinal polarization filter 19a and the numeral 13 is indicated on the screen 24.

If the graduated plate 25 is upwardly moved from the condition shown in FIG. 6, the area of the optically transmitting position detecting mark 17 overlapped by the photointerrupter 18 is once increased and then reduced and the output from the photointerrupter 18 is once increased and then reduced. When the decreasing output falls below the threshold value, the lighting is shifted from the lamp 20b to the lamp 20a. That is, when the measured value is 14.5 or above, the lamp 20a is lighted and at this time 15 exists in the rectangle 26 and the numeral 15 is indicated on the screen 24. In this way, the measured value is rounded to the nearest whole number and the lamps are controlled so that the lamp which is associated with the polarizing filter having the same direction of polarization as the polarizing filter associated with the rounded measured value may be lighted, and only the numeral which represents said rounded measured value is indicated on the screen 24.

Modifications of the embodiment described with reference to FIG. 6 will now be described. In the embodiment described above, polarizing filters have been used as optical filter means, but such optical filter means is not limited to polarizing filters. For example, color filters may be used. To describe this in brief with reference to FIG. 6, the longitudinal polarization filters designated at 19a and 35a may be replaced, for example, by red filters and the horizontal polarization filters designated at 19b and 35b may be replaced, for example, by blue filters. With this arrangement, the transmitted light through the red filter 35a will not pass through the blue filters 19b, while the transmitted light through the blue filter 35b will not pass through the red filters 19a, thus providing the same effects as in the case of the polarizing filters described above. As for the colors to be combined with the color filters, those which are in complementary color relation, such as red and blue, are selected.

Figure 7:
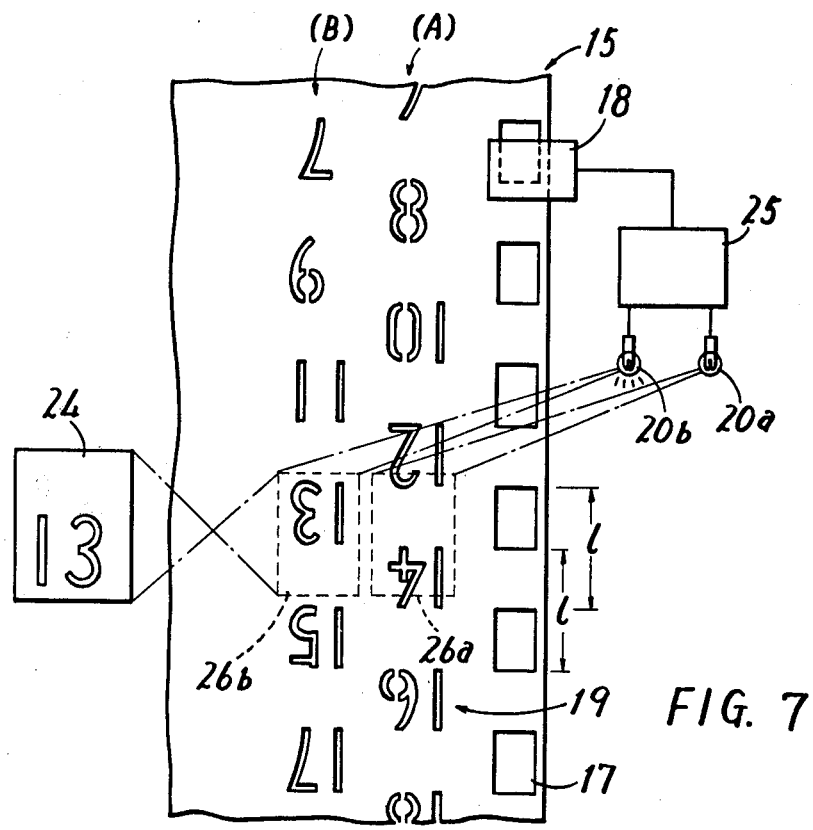
FIG. 7 illustrates still another embodiment of the invention, showing the principal portions corresponding to FIG. 3.

FIG. 7 is a diagrammatic illustration of the principal portions of a further embodiment of the present invention, showing the portions corresponding to those in FIG. 3. In FIG. 7, the parts which are the same as or similar to those in FIG. 3 are designated by the same reference numerals as those used in FIG. 3.

Referring to FIG. 7, this embodiment is also given consideration for increasing the size of graduated numerals. A graduated plate 15 is made of a suitable optically impervious material. The graduated plate 15 is provided with position detecting marks 17 for arithmetical rounding purposes in the form of optically transmitting rectangular areas equispaced around the outermost periphery thereof, said detection marks 17 being associated with a photointerrupter 18 comprising a light emitting diode and a phototransistor. Provided in relation to the pitch $l$ of the position detecting marks 17 are a plurality of rows or series (in this, embodiment, two rows A and B) of graduation numerals 19 formed by being perforated along and radially inside the row of detection marks 17. Thus, the graduation numerals 19, each having a longitudinal dimension equal to half the pitch $l$ of the detection marks 17, are arranged in two rows A and B in such a manner that in each row two such numerals are present in each space having a length equal to the pitch $l$.

The optical system of the indicating apparatus will now be described. The optical system includes two lamps 20a and 20b serving as light sources, condenser mirros (not shown) respectively disposed rearwardly of said lamps, and condenser lenses (not shown) respectively disposed forwardly of said lamps. The light beams passing through the condenser lenses are focused on the rows A and B of numerals and then pass through projecting lenses (not shown) and projected on a screen 24. If, for example, the lamp 20b is lighted, the light passing through the cutout in the row B of numerals emerges to indicate, e.g., 13.

The lamps 20a and 20b are controlled so that either one of them is lighted. This is related to the arithmetical rounding function which is carried out by a lamp switching circuit 25 controlled by the output from said photointerrupter 18. An embodied example of the switching circuit 25 is shown in FIG. 4.

The operation of the indicating apparatus will now be described with reference to FIG. 7. In FIG. 7, as in FIG. 3, the marginal portion of the circular graduated plate 15 and the circular arrays of position detecting marks 17 and numerals 19 are illustrated in a linear representation for facility of illustration, and it is to be pointed out that the graduated plate will be translated in a vertical direction. Rectangles 26a and 26b shown in chain lines in relation to the rows A and B of numerals 19 each indicate a range of an image to be projected on the screen 24. In the condition shown in FIG. 7, an optically transmitting position detecting mark 17 is overlapped by a certain area of the photointerrupter 18, when the output from the photointerrupter 18 causes the lamp switching circuit 25 to light the lamp 20b and the portion defined by the rectangle 26b is projected on the screen 24 to indicate the numeral 13. It is when the measured value is 12.5 or above and less than 13.5 that the numeral 13 is indicated.

If the graduated plate 15 is upwardly moved from the condition shown in FIG. 7, the area of the optically transmitting position detecting mark 17 overlapped by the photointerrupter 18 is reduced and the output from the latter is also reduced. The lamp switching circuit 25 has a threshold value preset therein so that when the output from the photointerrupter 18 is reduced below said threshold value, the lighting is shifted from the lamp 20b to the lamp 20a. That is, when the measured value is 13.5 or above, the lamp 20a is lighted. At this time, only the numeral 14 is present in the range defined by the rectangle 26a and the numeral 14 is indicated on the screen 24.

If the graduated plate 15 is downwardly moved from the condition shown in FIG. 7, the area of the optically transmitting position detecting mark 17 is once increased and then reduced and hence the output from the photointerrupter 18 is once increased and then reduced. When the decreasing output falls below said threshold value, the lighting is again shifted from the lamp 20b to the lamp 20a. That is, when the measured value is less than 12.5, the lamp 20a is lighted and at this time only the numeral 12 is present in the range defined by the rectangle 26a and the numeral 12 is indicated on the screen 24. If the graduated plate 15 is further downwardly moved in FIG. 7, when the measured value becomes less than 11.5, the lighting is shifted from the lamp 20a to lamp 20b. At this time, only the numeral 11 is present in the range of the rectangle 26b and the numeral 11 is indicated on the screen 24. In this way, the measured value is rounded to the nearest whole number and only the lamp that is related to the rounded measured value is lighted to indicate said nearest whole number.

The above embodiment has been described with reference to an arrangement wherein the graduated numerals 19 are arranged in two rows, but the number of rows is not limited to two and it is possible to increase it to three, four and so on. This will be described below.

Figure 8:
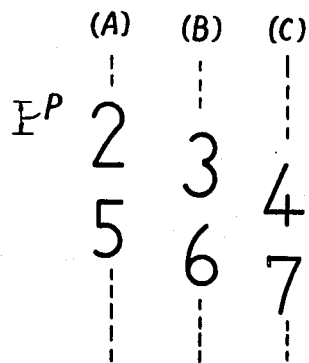
FIG. 8 is a diagrammatic view of a modification of the FIG. 7 embodiment, showing the arrangement of three series of graduation numerals.

First, consideration will be given to a case where graduation numerals are arranged in three rows. FIG. 8 is a diagrammatic illustration of a three-row arrangement of numerals. With $p$ on the left-hand side representing the spacing, the numerals are arranged by being successively assigned to the row A, the row B, the row C, the row A and so on, so that adjacent numerals are spaced apart from each other by $p$. The size of the numerals can be increased more than in the case of the two-row arrangement described above, and hence numerals of larger size can be projected on the screen 24 with increased legibility.

Figure 9:
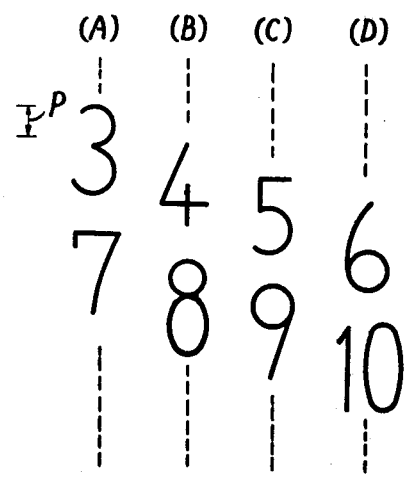
FIG. 9 is a diagrammatic view of another modification of the FIG. 7 embodiment, showing the arrangement of four series of graduation numerals.

Next, a four-row arrangement of numerals will be described. FIG. 9 is a diagrammatic illustration of such four-row arrangement. The numerals are arranged by being successively assigned to the row A, the row B, the row C, the row D, the row A and so on, with adjacent numerals spaced apart from each other by $p$. The four-row arrangement enables the size of numerals to be increased more than the three-row arrangement.

It will now be understood that the greater the number of rows in which numerals are arranged, the larger the size of numerals can be made, as described above. The above-mentioned spacing $p$ corresponds to the spacing which is obtained by angularly dividing the circular graduated plate 15 into the same number of equal segments as the desired number of graduated numerals. Thus, if $n$ represents the number of rows (where $n$ is an integer equal to or greater than 2), then the number of rows is given by $(n - 1) p$. It should be pointed out, however, that in the case of a circular graduated plate, since the nearer the center of the plate the narrower the spacing becomes, the number of rows cannot be so simply increased.

Figure 10:
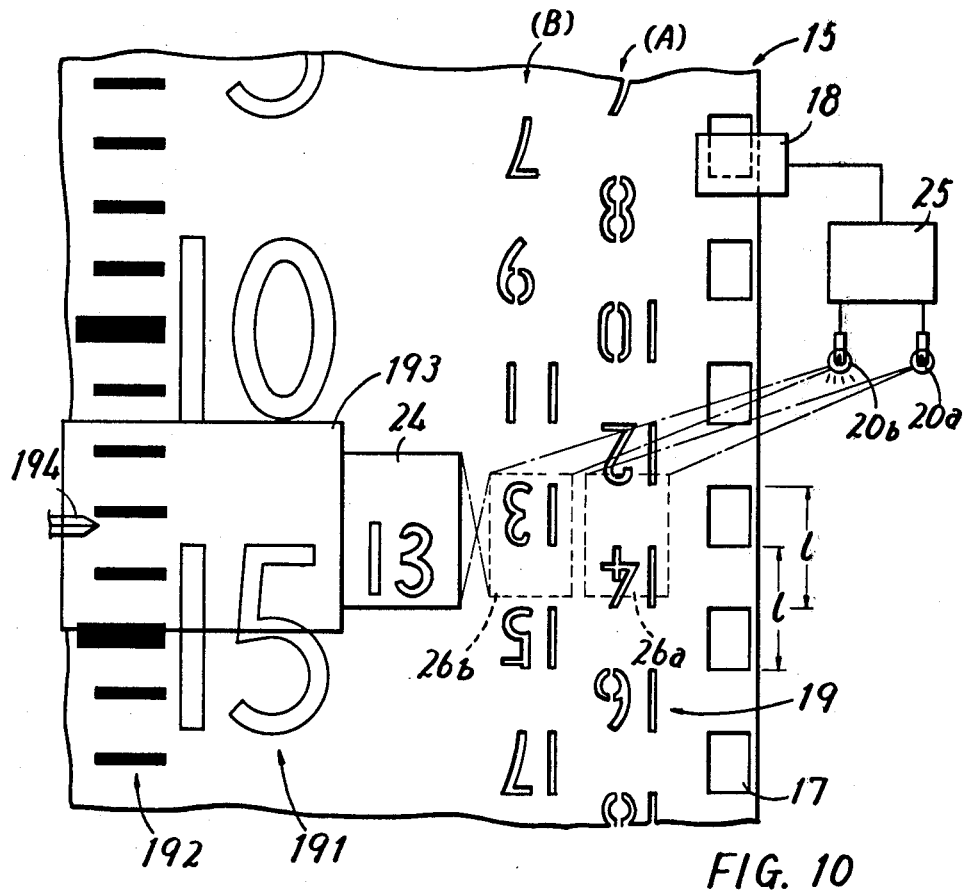
FIG. 10 illustrates a further embodiment of the invention, showing the principal portions corresponding to FIG. 3.

FIG. 10 is a diagrammatic illustration of the principal portions of another embodiment of the invention, showing the portions corresponding to those shown in FIG. 3. This embodiment has an additional scale incorporated therein for indication of measured values in an analog manner. Although this concept is equally applicable to the individual embodiments shown in FIGS. 3, 6 and 7, it will be described by way of illustration with reference to a case where it is applied to the embodiment shown in FIG. 7. Therefore, in FIG. 10, the parts which are the same or similar to those shown in FIG. 7 are designated by the same reference characters as those used in FIG. 7, and a description will be given of only those parts which differ from FIG. 7. In addition, in FIG. 10 some change has been made of the dimensional relationship of the elements.

Referring to FIG. 10, provided along and radially inside the row B of graduation numerals 19 are second graduated numerals 191 for indication of measured values in an analog manner. The graduation numerals 191 comprises, for example, every five numbers written on the graduated plate 15 in a single row along with graduations 192 so as to correspond to the graduation numerals 19. The numerals 191 and graduations 192 are seen through a suitable window 193. Since the optical system for digital representation previously described with reference to FIG. 7 requires some distance for its optical path, the distance from the window 193 to the numerals 191 and graduations 192 is relatively large. Thus, in order to eliminate the parallax, a pointer 194 is fixed in position close to the graduated plate 15.

As described above, by marking the graduated plate 15 with graduation numerals 191 and graduations 192 for analog representation and providing the pointer 194 for indication and the window 193 lying thereover, it is possible to indicate measured value not only in a digital manner but also in an analog manner. More particularly, in the condition shown in FIG. 10, viewing the window 193 gives an analog indication of "about 13.2", while in a digital aspect, an optically transmitting position detecting mark 17 is overlapped by a certain area of the photointerrupter 18 with the output from the latter causing the lamp switching circuit 25 to selectively light the lamp 20b, projecting the portion defined by the rectangle 26b on the screen 24, so that the numeral 13 is indicated. It is when the measured value is 12.5 or above and less than 13.5 that the numeral 13 is indicated. This corresponds to the analog indication "about 13.2". In addition, the sizes of the screen 24, window 193, etc. are not actual but results from illustration factors. In fact, the numeral on the screen, for example, 13, would be projected in a larger size.

According to this embodiment, with a minor modification it is possible to annex an analog representation, which provides great merits. Digital representation needs the provision of a power source, such as a battery, and lamps, and when this indicating apparatus is applied, for example, to a weighing machine for body weight measurement, it is a usual practice to arrange the switch S in FIG. 4 so that it is closed only when a load is applied to the weighing machine, in order to prolong the life of the battery and lamps. In such case, analog representation is indispensable. That is, it is called for when the digital representation system is out of order or when the battery has been used up. Further, analog representation is also indispensable in order to make up for the drawbacks of digital representation. For example, if a certain measured value is rounded to the nearest whole number, 0 in the units place in digital representation means "−0.5 or above and less than 0.5" in analog representation. For example, 100 would be "99.5 or above and less than 100.5". Therefore, analog representation is necessary for fine adjustment such as zero-point correction, span correction and accuracy correction or for reading a value between adjacent figures and particularly it is indispensable for manufacturers to adjust their instruments for shipment. In this way, analog representation provides great merits.

For the objects described above, the application of analog representation is not limited to the entire region covering all the graduated numerals and it may be applied to an important or desired region alone, for example, to a region in the vicinity of the zero point and/or of predetermined graduations. Further, in the above embodiment, the graduated plate 15, on which graduation numerals 19 for digital representation are arranged, has been utilized in order to arrange also thereon graduation numerals 101 and graduations 192 for analog representation. However, such graduation numerals 101 and graduations 192 may be arranged on another member having the same shaft as the shaft 14 of the graduated plate 15. Further, in order to illuminate the analog representation region, a separate lamp may be used or it may be contemplated to use suitable reflecting means to direct part of the light from the existing lamps 20a and 20b toward said region for illumination.

The various embodiments which have been described so far are related to an indicating apparatus including weight measuring means. For this reason, the stepwise numerical values to be indicated are measured values of weight whose figures in specified less significant digits have been arithmetically processed. However, they are not limited to numerical values arithmetically processed with respect to their figures in specified less significant digits. For example, they may be numerical values of price concerning weight, provided that arithmetically processed numerical values are stepwise indicated. Further, it is also possible to provide a plurality of numerical representations. For example, measured values of weight and measured values of price concerning such weight may be simultaneously indicated.

Further, numerical value representing characters which are selectively indicated by a plurality of light sources have been indicated at a common position (screen 24) by the use of optical projecting means. However, it is also possible to provide an arrangement wherein the numerical value representing character which is related to the lamp which is lighting now under the control of light source switching system is simply recognized as such.

Further, a combination of optically transmitting marks and a photointerrupter has been used as displacement detecting means, but such optical transmitting marks may be replaced by optically reflective marks. Furthermore, the displacement detecting means is not limited to optical detecting mechanisms, and, for example, movable electric contact means may be used.

Further, the present indicating apparatus is not limited in application to a weight measuring device but is applicable to other devices. It is, therefore, to be understood that the preferred embodiments of the invention described herein are only illustrative and that the scope of the invention is to be determined solely by the appended claims.

What is claimed is:

1. An indicating apparatus, comprising:
   a scale plate movable in a predetermined direction,
   means for producing a physical quantity,
   means responsive to a physical quantity produced by said physical quantity producing means for displacing said scale plate by an amount correlated with said physical quantity,
   said scale plate having characters successively arranged thereon in said direction of movement which represent numerical values stepwise correlated with said physical quantity, said scale plate also having displacement detecting mark means arranged thereon in said direction of movement so as to be correlated with the successive arrangement of said numerical value representing characters,
   a plurality of light sources opposed to said scale plate and arranged to be individually correlated with only a plurality of predetermined adjacent ones among said numerical value-representing characters,
   power source means for energizing said plurality of light sources,
   means responsive to said displacement detecting mark means for producing a signal representing the displacement of said scale plate, and
   energization control means responsive to said displacement signal for selectively energizing only one of said plurality of light sources thereby to selectively indicate one of said plurality of adjacent numerical value representing characters correlated with said physical quantity, whereby the numerical value correlated with said physical quantity is stepwise indicated by said numerical value representing character.

2. An indicating apparatus as set forth in claim 1, wherein said physical quantity producing means includes weight measuring means and said numerical value representing characters on said scale plate include weight representing characters.

3. An indicating apparatus as set forth in claim 1, including an optical system for projecting at a common position said numerical value representing characters which are selectively indicated by said plurality of light sources.

4. An indicating apparatus as set forth in claim 1, including a graduated representation system for indicating said physical quantity in an analog manner.

5. An indicating apparatus as set forth in claim 1, wherein said numerical value representing characters on said scale plate are arranged in a single row.

6. An indicating apparatus as set forth in claim 5, wherein said numerical value representing characters are spaced apart from each other so that the simultaneous indication of adjacent characters by said energized light source is prevented.

7. An indicating apparatus as set forth in claim 1, wherein said plurality of numerical value representing characters are equally divided into groups and the plurality of characters in each group are successively arranged in different rows, whereby the characters at the $n$ th position in the individual groups (where $n$ is a positive integer and $1 \leq n \leq$ the number of characters in each group) form a row, whereby said characters are arranged in a plurality of rows, said plurality of light sources being individually associated with said plurality of rows.

8. An indicating apparatus as set forth in claim 7, wherein said rows formed by said characters are spaced apart from each other and adjacent characters in said rows are spaced apart from each other, whereby the simultaneous indication of adjacent or successive characters by said selected light source is prevented.

9. An indicating apparatus as set forth in claim 1, wherein said energization control means comprises circuit means responsive to said displacement signal for performing a multi-stable function, and switching devices whose conduction is controlled in response to the output from said multi-stable circuit means and which are connected to said light sources for energization.

10. An indicating apparatus as set forth in claim 9, wherein said plurality of light sources comprise two light sources and said multi-stable circuit means comprises bistable circuit means.

11. An indicating apparatus as set forth in claim 1, wherein said physical quantity producing means comprises weight measuring means and said numerical value representing characters on said scale plate comprise numerical value representing characters arithmetically processed so as to indicate the numerical value of price concerning weight.

12. An indicating apparatus as set forth in claim 11, wherein said numerical value representing characters representing numerical values stepwise correlated with said physical quantity are successively arranged in accordance with predetermined rules concerning weight and price.

13. An indicating apparatus as set forth in claim 1, wherein said plurality of numerical value representing characters are equally divided into groups and the plurality of numerical value representing characters in each group are successively provided with filters different in optical properties from each other, whereby the characters at the $n$ th position in the individual groups (where $n$ is a positive integer and $1 \leq n \leq$ the number of characters in each group) are associated with filters identical in optical properties with each other, whereby the plurality of different types of filters are successively arranged and the simultaneous indication of adjacent characters by said selected light source is thus prevented.

14. An indicating apparatus as set forth in claim 13, wherein said plurality of different types of filters are different from each other in color transmitting property.

15. An indicating apparatus as set forth in claim 13, wherein said plurality of different types of filters are different from each other in polarization property.

16. An indicating apparatus as set forth in claim 1, wherein said numerical value representing characters stepwise correlated with said physical quantity comprise numerical value representing characters arithmetically processed with respect to said physical quantity.

17. An indicating apparatus as set forth in claim 16, wherein said arithmetically processed numerical value representing characters representing numerical values stepwise correlated with said physical quantity are such that numerical value representing characters in a predetermined digit position are regularly and successively arranged.

18. An indicating apparatus as set forth in claim 17, wherein the positional relationship between the arrangement of said position detecting marks and the regular and successive arrangement of said numerical value representing characters is such that said regular and successive arrangement of the numerical value representing characters in said predetermined digit position becomes an arrangement of numerical values in which that figure in said physical quantity which is positioned in a digit less significant than said predetermined digit is arithmetically processed, whereby the numerical value of said physical quantity whose figure in said digit less significant than said predetermined digit has been arithmetically processed is indicated by said numerical value representing character.

* * * * *